Aug. 13, 1968    R. H. ELLIS    3,396,894
SOLDER DEVICE
Filed May 11, 1965    2 Sheets-Sheet 1
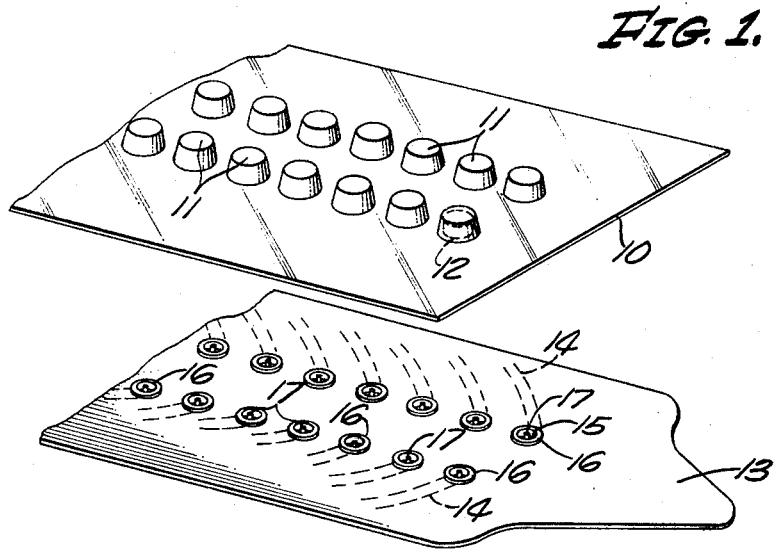
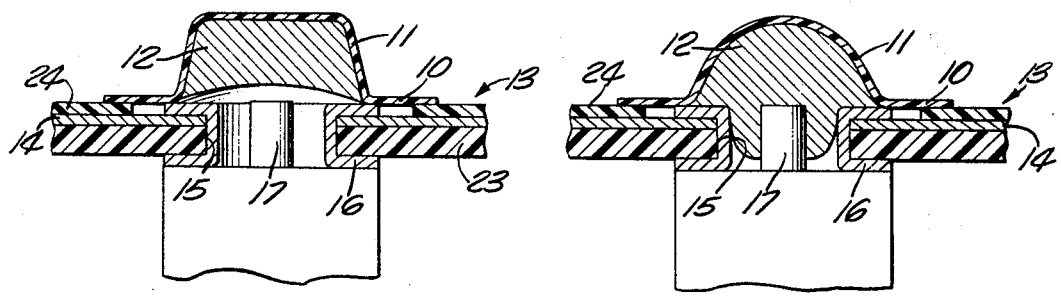
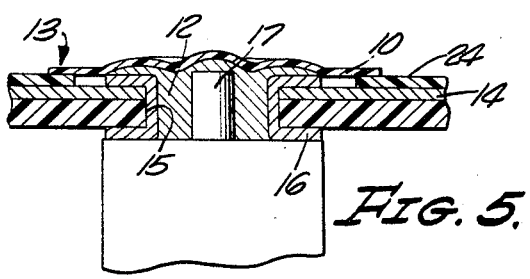
ROGER H. ELLIS
INVENTOR.
BY Lyon & Lyon
ATTORNEYS Aug. 13, 1968  R. H. ELLIS  3,396,894
SOLDER DEVICE Filed May 11, 1965  2 Sheets-Sheet 2

ROGER H. ELLIS
INVENTOR.

BY Lyon & Lyon
ATTORNEYS

United States Patent Office 3,396,894
Patented Aug. 13, 1968

3,396,894
SOLDER DEVICE
Roger H. Ellis, Atherton, Calif., assignor to Raychem Corporation, Redwood City, Calif., a corporation of California
Filed May 11, 1965, Ser. No. 454,896
11 Claims. (Cl. 228—56)

ABSTRACT OF THE DISCLOSURE

An applicator for simultaneously applying a plurality of bodies of solder or other heat fusible material in which the bodies of the material are disposed in heat recoverable cups formed from or positioned on a sheet of material. When heat is applied to the cups, they recover, the heat fusible material melts, and the recovering cup material forces the heat fusible material out into contact with the objects to be soldered or otherwise connected.

---

This invention relates to a multiple applicator for solder or similar meltable material and more particularly relates to an applicator formed of a heat recoverable material which has particular utility in simultaneously making a plurality of soldered terminations or joints.

In much of the electronic and electrical equipment produced today the quality of the electrical connections is of critical importance. Although various proposals have been made for replacing soldered joints or terminations, soldered connections, if properly made, continue to display superior electrical characteristics. For this reason, hand soldering of each connection is still being used in many applications. When there are a plurality of joints to be made in the same general area, as is the case, for example, in a printed circuit board, it would be highly desirable to be able to make all of the joints simultaneously, if uniformity of quality could be assured.

To achieve the benefits of soldering without sacrificing reliability, the number of variables involved in the soldering process must be minimized. One way to do this is through the prepackaging of metered amounts of flux and solder. If a plurality of such solder preforms could be accurately located relative to a plurality of termination points or other connections to be soldered, and uniform application of the preforms insured, multiple joints could be made in a single quick and inexpensive operation.

It is therefore an object of the present invention to provide an applicator useful in simultaneously making a plurality of solder or similar joints.

It is also an object of the present invention to provide such an applicator in which a plurality of solder preforms are packaged in a strip of heat recoverable material.

It is another object of the present invention to provide such an applicator in which the heat recoverable material when subjected to heat will force the solder preform material in a uniform manner to and around the connection to be soldered.

Other objects and advantages of the present invention will become more apparent upon reference to the accompanying description and drawings in which:

FIGURE 1 is a perspective view of the applicator of the present invention together with a printed circuit board having a plurality of termination points to be soldered;

FIGURE 3 is a cross sectional view of a portion of the applicator of the present invention in position over a termination point;

FIGURE 4 shows the same applicator portion after heat has been initially applied; and FIGURE 5 shows the same applicator portion after the heating cycle has been completed.

Figure 2:
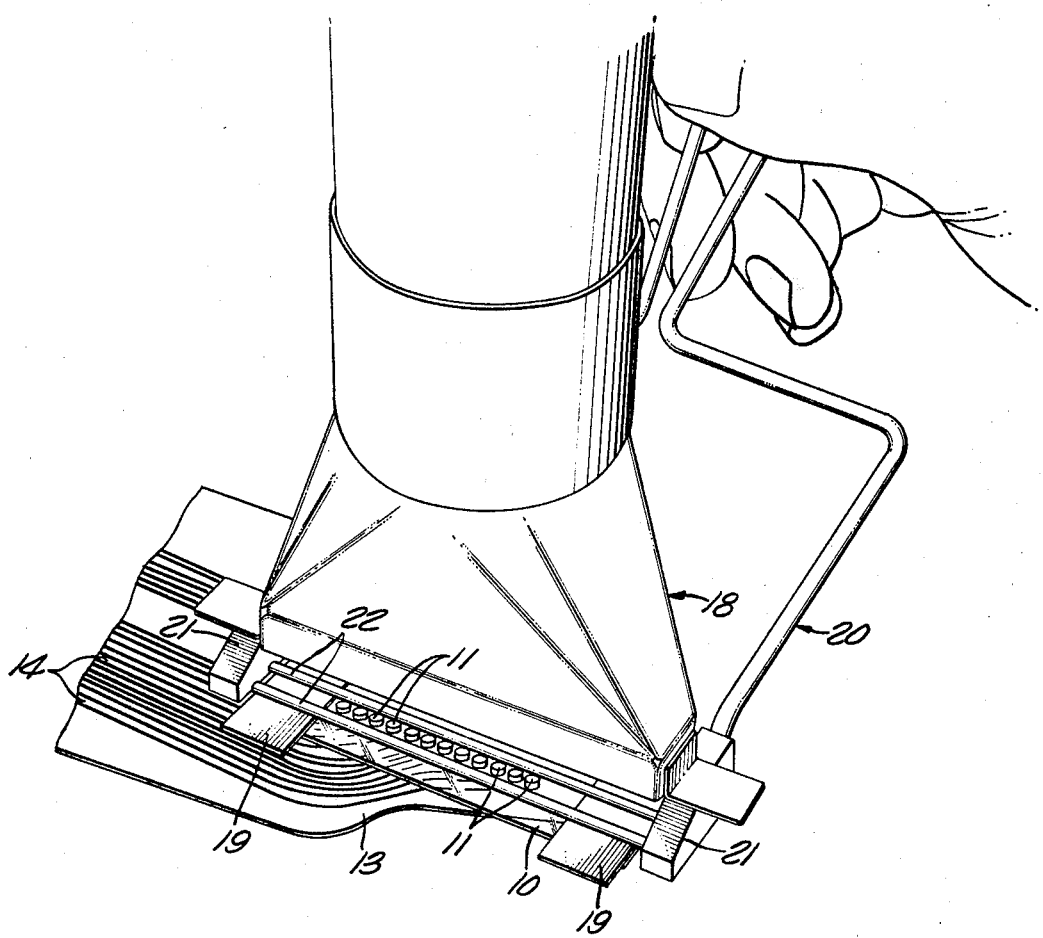
FIGURE 2 is a perspective view of the applicator in position on the printed circuit board together with a heating tool.

Briefly, the present invention envisions the packaging of a plurality of solder preforms containing metered amounts of solder and flux in cups formed in a sheet of heat recoverable material, that is, a material having the property of plastic or elastic memory. Examples of such heat recoverable materials may be found in Currie patent 2,027,962 and Cook et al. patent 3,086,242 which are incorporated by reference herein. Polymeric materials which have been cross-linked by chemical means or by irradiation, for example, with high energy electrons or nuclear radiation, such as those disclosed in the Cook et al. patent, are preferred for use in the present invention. A particularly suitable material is an irradiated thermally stabilized polyolefin which has the desirable characteristics of transparency and easy formability. For example, the cups in the sheet may be made by deforming selected portions of a sheet of cross-linked polymer while these portions are heated to a temperature above the crystalline melting point of the cross-linked polymer to a desired configuration and then cooling the material while keeping the expanded portions under deforming pressure. The cups thus formed will retain their expanded shapes until the material is again heated, at which time they will recover to their original shape. The action of the material as it recovers to its original shape forces the melted flux and solder out of the cups. By positioning the applicator over a plurality of termination points or the like and applying heat, each termination point will be uniformly soldered. The term cups as used in this specification is meant to include any receptacle for solder or the like regardless of its physical configuration.

Turning now to the drawings, FIGURE 1 shows in perspective a preferred embodiment of a solder applicator constructed in accordance with the present invention positioned above a printed circuit board having a plurality of termination points. The applicator includes a sheet 10 of material capable of having the property of plastic or elastic memory imparted thereto which is provided with a plurality of heat recoverable cup-like areas 11 formed in the manner described above. These cups may be formed by pressure molding, vacuum forming, stamping or the like.

If desired, only the cups need be formed of a material capable of having the property of heat recoverability imparted thereto. In such a case the sheet itself may be formed of any suitable material and the cups associated therewith in any appropraite manner. Each of the cups 11 is then filled with a solder preform 12, comprising a metered amount of solder and suitable flux. The applicator 10 is positioned above a conventional printed circuit board 13 having a plurality of electrical conductors 14 formed thereon. Each of the electrical connectors 14 terminates adjacent to a hole 15 which is coated or lined with tin or another suitable solder wettable material 16. Pins 17 from the components to be mounted on the board 13 extend into the holes 15.

In FIGURE 2, the applicator 10 has been properly positioned on the board 13 so that the cups 11 are immediately above the holes 15 and a heating tool 18 is positioned over the applicator 10. Preferably, the applicator 10 is held in position by strips 19 of a pressure sensitive adhesive at each end, and a hold down fixture 20 is also used to prevent relative movement between the board and applicator until after the solder has solidified. Of course, any suitable means to prevent relative movement of the applicator and board could be used. A typical hold down fixture, such as that shown, is provided with end pieces 21 and cross rods 22 which fit on either side of the cups 11. The hold down fixture 20 is ordinarily only used when a convection type heating tool such as that shown is used. If a conduction heating method were used, the heating tool itself would fit down over the applicator and serve to insure against movement of the parts.

Turning now to FIGURES 3, 4 and 5, the various stages of the heating cycle are shown. In FIGURE 3, a cup 11 of the sheet 10 is positioned on the board 13 such that the solder preform 12 is located immediately above the hole 15. As can be seen, the board 13 is conventional and has an insulating substrate 23 such as epoxy resin, metallic conductors 14, and a non-conductive coating 24 disposed over the entire surface of the board except in the vicinity of the holes 15.

As heat is applied, the flux in the solder preform melts cleaning the surface to be soldered. As shown in FIGURE 4, when sheet 10 reaches its crystalline melting point, the solder filled cup 11 begins to return to its original flat configuration. This action forces the melted flux and solder to the termination point. As illustrated in FIGURE 5, at the completion of the heating cycle, the solder has completely enveloped the pin 17 and the hole lining 16 to form a connection between them having excellent mechanical and electrical properties. When the solder has cooled, the plastic sheet 10 is removed.

When sheet 10 is transparent, the end of the heating cycle is easily observed by the sudden change from the original dark gray color of the solder to a bright silver when it flows. The length of the cycle can be controlled by automatic timing in high volume production. Visual inspection of the termination point can be made through transparent sheet 10 before it is removed. The result is the reliable formation of multiple terminations by accurately locating the proper amount of solder and flux above the termination points and positively forcing it into the terminating points as it flows.

From the foregoing description, it can be seen that a solder applicator has been provided which makes the simultaneous soldering of a plurality of terminal points easy, quick and reliable. By using the applicator of the present invention, the numerous advantages that the solder is positively forced into the area by the recovery of the cup of heat recoverable material so that a good connection is assured, and that the correct amount of solder and flux may be accurately predetermined in advance of the soldering operation.

The invention may be embodied in other specific forms not departing from the spirit or central characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

I claim:
1. An applicator for use in simultaneously applying a plurality of bodies of heat meltable material comprising a sheet provided with a plurality of heat recoverable cups.
2. The applicator of claim 1 wherein said cups are formed from a material comprising a cross-linked polymer.
3. The applicator of claim 2 wherein said cups are formed from a material comprising an irradiated polymer.
4. An applicator for use in simultaneously applying a plurality of bodies of heat meltable material comprising a sheet provided with a plurality of heat recoverable cups, each of said cups having one of said bodies positioned therein.
5. An applicator for use in simultaneously applying a plurality of bodies of heat meltable material comprising a flat sheet having a plurality of heat recoverable cups formed therein, each of said cups having one of said bodies positioned therein, said cups being capable of being recovered upon being heated above the crystalline melting point of the material from which said cups are formed whereby the entire sheet becomes substantially flat and causes the bodies to be forced out of said sheet.
6. An applicator for use in simultaneously making a plurality of soldered connections, comprising a sheet provided with a plurality of heat recoverable cups, each of said cups having a solder preform positioned therein.
7. The applicator of claim 6 wherein said cups are formed from a material comprising a cross-linked polymer.
8. An applicator for use in simultaneously making a plurality of soldered connections comprising a flat sheet having a plurality of heat recoverable cups formed therein, each of said cups having a solder preform positioned therein, said cups being capable of being recovered upon being heated above the crystalline melting point of the material from which said cups are formed whereby the entire sheet becomes substantially flat and causes the solder preforms to be forced out of said sheet.
9. The applicator of claim 8 wherein said solder preforms contain solder and flux.
10. The applicator of claim 9 wherein the crystalline melting point of the material from which said cups are formed is lower than the melting point of said solder.
11. The applicator of claim 8 wherein said cups are formed from a material comprising a cross-linked polymer.

References Cited

UNITED STATES PATENTS

| 3,239,125 | 3/1966 | Sherlock | 228—56 |
| 3,297,819 | 1/1967 | Wetmore | 264—230 |
| 3,243,211 | 3/1966 | Wetmore | 287—78 |
| 3,301,439 | 1/1967 | Kosar | 222—52 |

RICHARD H. EANES, JR., *Primary Examiner.*